No. 856,283. PATENTED JUNE 11, 1907.
F. MÜLLER.
POWER TRANSMITTER.
APPLICATION FILED AUG. 17, 1904.

WITNESSES:

INVENTOR
Friederich Müller,
By Henry J. Miller
his Attorney.

No. 856,263.

PATENTED JUNE 11, 1907.

F. MÜLLER.
POWER TRANSMITTER.
APPLICATION FILED AUG. 17, 1904.

UNITED STATES PATENT OFFICE.

FRIEDERICH MÜLLER, OF ELIZABETH, NEW JERSEY.

POWER-TRANSMITTER.

No. 856,283.     Specification of Letters Patent.     Patented June 11, 1907.

Application filed August 17, 1904. Serial No. 221,004.

*To all whom it may concern:*

Be it known that I, FRIEDERICH MÜLLER, a citizen of the United States, residing at Elizabeth, in the county of Union and State of New Jersey, have invented certain new and useful Improvements in Power-Transmitters, of which the following is a specification, reference being had therein to the accompanying drawings.

This invention has for its primary object to provide a speed-changing power-transmitter in which the driving relation of the driving to the driven member through a series of independent connections remains uninterrupted in changing from one speed to another in the same direction.

It has for its further object to provide an advantageous arrangement of the independent connections between the driving and driven members of the transmitter with common means whereby they may be successively operated.

The invention includes a driving and a driven member, and a plurality of independent connections between the same constructed and arranged to communicate successively from the one to the other of said members different relative speeds, and to maintain a continuous driving relation between the same throughout all changes of speed.

The invention further includes special devices for throwing into and out of operation the clutches employed in the transmitter, and a particular arrangement of the connecting gearing and means for operating the same to transmit variable speeds in the same or opposite directions.

The mechanism employed for communicating different speeds from the driving to the driven member may involve the employment of a series of various disengageable clutch or other transmitting devices, designed to communicate to the driven member different relative speeds derived from the driving member each clutch as employed being preferably self-acting and capable of transmitting power in one direction only, whereby the clutch connection deriving the highest speed from the driving member will automatically engage its coacting part to communicate a corresponding speed to the driven member, the clutches of the other connections driven at a lower speed running idly with their coöperating parts in contact in readiness for operative engagement but not in actual driving relation.

The connections intermediate the driving and driven members are preferably of such character and so controlled that the manipulation of the one having a higher speed determines as to the action or inaction of the adjacent connection in driving the driven member by inducing the driving engagement or the disengagement of the coöperating clutch-parts of the latter; the clutches of the series being controlled by means of a common progressively-acting actuator whereby the lower-speed clutch-parts may be caused to assume contact but non-driving relations while those of an adjacent higher speed-clutch are in driving relation and those of the still higher speed or speeds are maintained out of contact relation, the shifting of the common actuator progressively in one direction causing the coöperating parts of the higher speed-clutches to progressively assume driving engagement and those of the next lower clutches to maintain contact but non-driving relation, while the shifting of such actuator in the opposite direction causes a reversal of such actions and the progressive withdrawal of the lower-speed clutch parts from contact relation, complete disengagement of the lowest-speed clutch parts entirely interrupting the operative driving connection between the driving and driven members which is otherwise maintained throughout the passage from one speed to another.

While the present improvement is not dependent upon the employment of any particular form of clutch, I prefer to employ a friction-clutch designed for automatic engagement of its coöperating parts in one direction of rotation only, and to so construct the actuator for the several clutches of a series that it will act progressively upon each to gradually effect the engagement and disengagement of its operative parts so as to avoid the production of shocks in changing from one speed to the next higher or lower, as the case may be; but it is to be understood that for certain purposes such friction clutches may be replaced by positive clutches in which no provision is made to guard against shocks resulting from the speed-changing operation.

It will be observed that by the use of self-acting clutches the power required for effecting the driving engagement of their parts is derived solely from the driving member of the train, and is not communicated by the operator, who merely establishes conditions under which such automatic action takes place, and the direct manual control of such clutches therefore is limited to the disengagement of their coöperative parts, which may be done either by forcibly separating them, or by displacing positive engaging abutments therefor upon the members of the connecting train of gearing by which they are carried.

It will be seen that as thus constructed the present speed-changing device is particularly adapted for use in connection with automatic machine-tools in which it is important that the change of speed be effected by the employment of a cam; the continuous driving relation maintained between the driving and driven members insuring the continuous movement of the cam at the point of change, which is not obtainable in machines having speed-changing mechanism involving a "dead-point" between consecutive speed connections.

The present improvement is represented in the accompanying drawings in several different embodiments all involving the same general principles of construction and operation, although differing widely in details.

The invention is represented in Figures 1 to 5, inclusive, in its simplest form as applied to an automatic machine-tool; Fig. 1 being an elevation partly in section of a counter-shaft provided with the improvement in connection with one end-portion of the machine-tool, Fig. 2 an end view of the same, and Fig. 3 a plan of the driving members and their connections; Fig. 4 is a face view of the clutch-pulley employed in this form of the improvement with the driving disk removed to expose the members within, and Fig. 5 a transverse section of the same.

Referring to Figs. 1 to 5, inclusive, the main shaft 1, constituting the driving member of the transmitter, carries two belt-pulleys 2 and 3 of different diameters, from which are led the belts 4 and 5, respectively, to the fast and loose pulleys 6, 7 and 8, 9, mounted upon the counter-shaft 10 which constitutes the driven member of the transmitter. The loose pulley 6 is provided with a self-engaging clutch-device, and is formed with a cylindrical cavity against the inner periphery of which normally rests the bearing portion 13, 14 of each of two clutch-levers 11, 12 of which two adjacent ends abut together, while the opposite ends are pivotally connected by means of the pins 15 and 16, respectively, with one end-portion of an operating lever or rocker 17 having its enlarged end 18 upon the other side of the shaft 10 embraced between two lugs 19 upon the driving disk 20 fixed upon the shaft 10. The levers 11 and 12 constitute in function a single divided part or member of which the opposite ends are pivotally connected with the operating lever or rocker 17 at different distances from the axis of rotation, and may be, by the movement of said lever or rocker, caused to recede from or approach each other to bring them respectively into and out of operative engagement with the inner wall of the pulley 6 which constitutes a drum serving as the inclosing member of the clutch. A spring 21 intermediate the clutch-lever 11 and operating lever 17 tends to draw the latter transversely so as to force the pivoted ends of the clutch-levers apart to press the bearing portions 13 and 14 into driving contact with the rim of the loose pulley 6. It is evident that any tendency of the loose pulley to rotate in one direction relatively to its shaft 10 will be resisted by a cramping action induced by the engagement of the clutch-levers 11 and 12 with its rim with a force proportionate to that communicated to the pulley by the belt 4 or the resistance of the shaft 10 to turning, and any tendency of the pulley 6 to rotation in the opposite direction relatively to its shaft and the disk 21 fixed thereon will be unresisted, as the engagement of the lugs 19 with the end 18 of the operating lever 17 will overcome the tension of the spring 21 in relieving the frictional pressure of the clutch-levers 11 and 12 upon the rim of the pulley 6. The position of the driving belt 4 is controlled by a belt-shifter consisting of a longitudinally movable rod 22 having belt-engaging fingers 23 connected with a hand lever 24, and the position of the driving belt 5 is similarly controlled by a belt-shifter consisting of the angular lever 25 upon the rock-shaft 25ª mounted in fixed bearings 26, carrying at its free end a pair of belt-engaging fingers 27 while another arm 25ᵇ upon said rock-shaft is connected by means of a cord or chain 28 with one arm of a bell-crank lever 29 whose other arm carries a roller-stud 30 lying in the path of movement of and adapted for engagement with a rotary-cam 31 carried by a shaft 32 of the machine-tool to be actuated, which shaft is driven by means of a worm-wheel 33 and worm 34 mounted upon a worm-shaft 35 deriving its motion from a pulley 36 thereon connected by a belt 37 with a pulley 38 upon the counter-shaft. The operative portion of the machine tool may derive its motion at the different speeds communicated from the pulleys 2 and 3 of the main-shaft 1, from a belt-connection with the pulley 39 upon the counter-shaft 10.

Figures 1, 2, 3, 4, 5:
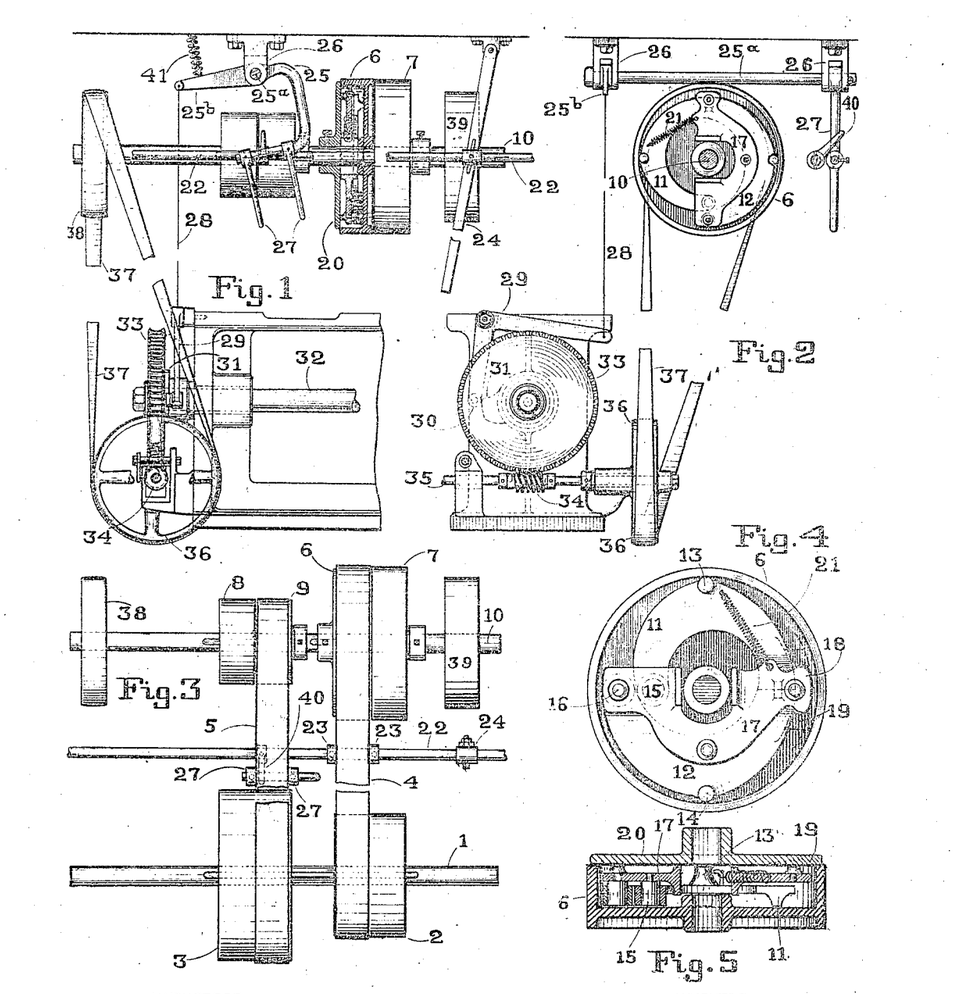

In the positions of the belt-shifters represented in the drawings, the belt 4 connects the driving pulley 2 with the loose clutch-pulley 6, while the belt 5 connects the pulley 3 with the loose-pulley 9 and thus the counter-shaft 10 is driven through the clutch of the pulley 6 at the slower speed proportionally to the relative sizes of the pulleys 2 and 6. As the cam 31 passes from engagement with the roller-stud 30 of the bell-crank lever 29, and the belt 5 becomes shifted to the fast-pulley 8, the latter is picked up by its belt and the shaft 10 is rotated at the higher speed, the clutch-parts of the pulley 6 being relieved from driving relation by the action of the lugs 19 of the fast disk 20 upon the end of the operating lever 17, as before described. The reëngagement of the cam 31 with the lever 29 again causes the shifting of the belt 5 to the loose-pulley 9, which causes the automatic reëngagement of the clutch-parts 11, 12 and 6 by the release of the lever 17 from the lugs 19.

The stopping of the machine is effected by throwing the belt-shifting lever 24 to the right, Fig. 1, which operates to move the belt 4 upon the loose pulley 7. To insure the stoppage of the machine by such manual action, even when the bell-crank lever 29 is not in engagement with the cam 31, an additional finger 40 is mounted upon the shift-rod 22 in such manner as to enter the space between the belt-engaging fingers 27, by means of which the shifting lever 25 may be thrown into inoperative position against the tension of its spring 41, to cause the belt 5 to be run upon the loose-pulley 9 and the power of both connections intermediate the driving and driven shafts to be withdrawn from the counter-shaft 10.

In Figs. 1 to 5 inclusive is shown a plurality of belt and pulley connections between the driving and driven members involving the use of only a single clutch in connection with belt-shippers, but in Figs. 6 to 11, inclusive, is represented a form of the improvement involving several trains of spur gearing intermediate the driving and driven shafts, each train comprising a separate clutch operated by a common shift-rod. In these figures, the main or driving shaft 1 is shown provided with three fixed gear-wheels 42, 43 and 44 of different sizes, the two former meshing with the clutch gear-wheels 45 and 46, respectively, loosely mounted upon the hollow counter-shaft 47 and the latter gear-wheel 44 with an intermediate 48 meshing in turn with a loose clutch-gear 49 upon the shaft 47. The stepped clutch-wheels 45, 46 and 49 are constructed precisely the same excepting in size, each being formed with a cylindrical cavity having an annular flange 50 embraced by the slotted outer ends of two clutch-levers 51 whose inner ends are normally held by means of flat springs 52 against shoulders 53 presented by notches formed in the loose sleeve 54 mounted upon the hub of the clutch-wheel and provided with a peripherally notched flange 55. The disk 56 is fixed upon the hollow shaft 47 and is provided with one or more radial holes 57 in which are inserted the spring-pressed sliding pins 58 each having a lateral tooth 59 passing through a suitable radial slot in the disk and normally lying in one of the peripheral notches of the flange 55. The outer end of the radial hole 57 is closed by means of a screw-plug 60 between which and the bottom of a socket in the outer portion of the sliding pin 58 is inserted a spring 61 tending to normally maintain said pin in its inner position. Within the hollow driven shaft is introduced a longitudinally sliding shift-rod 62 having an enlarged operative portion 63, with conical extremities connecting the same with the reduced portions, for engagement with the ends of the sliding pins 58. The shift-rod is shown with its reduced portion passing through a screw-plug 64 in one end of the shaft 47, and provided with a stop-collar 65 adapted for engagement with said plug and with a grooved collar 66 embraced by the forked end of a shift-lever 67 pivoted at 68 to a suitable fixed abutment.

Figures 6, 7:
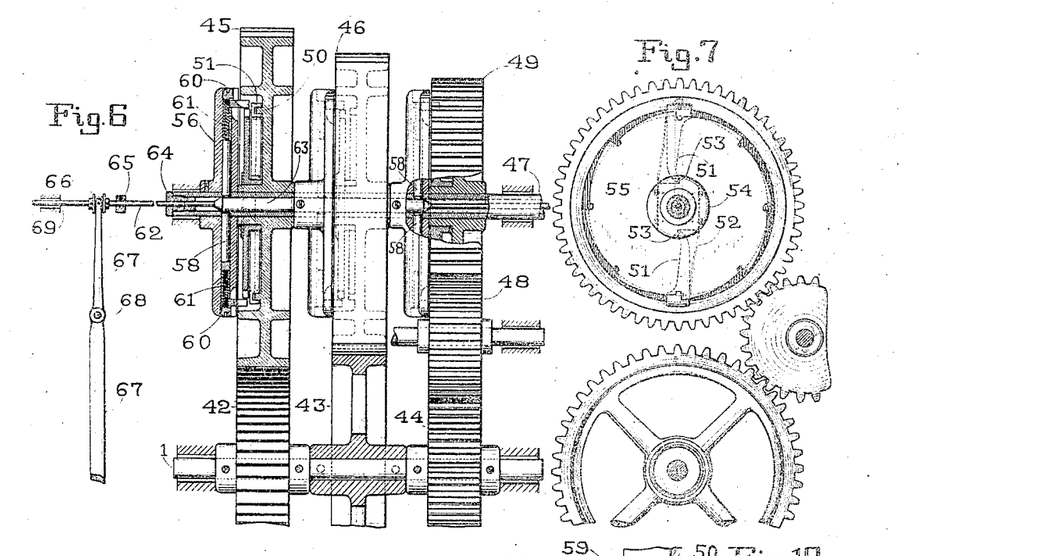
Figs. 6 to 11, inclusive, represent the improvement embodied in another form of transmitting mechanism, Fig. 6 being a side view, Fig. 7 an end view and Fig. 8 a plan view, all partly in section, of the several members of the transmitter, Fig. 9 an enlarged transverse sectional view of a portion of one of the clutch-wheels with the clutch-controlling device, and Figs. 10 and 11 external elevational and plan views of the same.
Figures 8, 9, 10, 11:
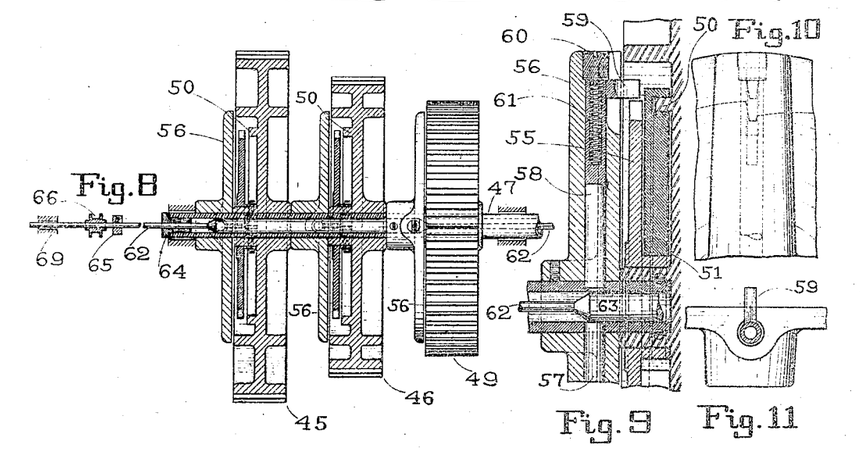

The operative portion 63 of the shift-rod is made of a length equal to or slightly exceeding the distance between the pins 58 of the extreme clutch-wheels of the series, and in the position shown in Figs. 6 and 8 operates to hold out of inner operative position all the pins 58 of the clutch-wheels and to thereby enable them to be driven idly without any effect whatever upon the driving shaft 47. As the shift-rod is moved toward the right by operation of the lever 67, the pins 58 of the clutch-wheel 45 are first enabled to move inwardly under the action of their springs 61, whereby their teeth 59 are enabled to engage the peripheral notches of the flange 55 whose sleeve normally rotates continuously with the loose gear-wheel 45 when the teeth 59 of the pins 58 are in inoperative position, but the locking of the disk 56 to the flange 55 whose hub 54 causes the clamping of the clutch-levers 51 upon the rib 50 serves to automatically couple the parts 45 and 56, whereby the shaft 47 is driven at the slower speed communicated from the driving shaft through the intermeshing gears 42 and 45. The continued movement of the shift-rod 62 to extreme position at the right when the stop-collar 65 is in contact with the plug 64 causes the conical end of its operative portion to pass beneath the pins 58 and to thereby permit a similar engaging action of the clutching parts of the gear-wheel 46 which is rotated at a more rapid speed, thereby causing the shaft 47 to be rotated at a corresponding speed, the action of the clutch-dogs 51 upon the flange 50 of the gear-wheel 45 being interrupted by the accelerated rotation of the disk 56, locked to the flange 55, relatively to the gear-wheel 45 and its flange 50. The return of the shift-lever 67 to initial position produces a reciprocal effect upon the clutches, and wholly interrupts the driving connection between the driving and driven shafts.

By throwing the shift-lever 67 in the opposite direction from that before described with the grooved collar 66 in contact with the bearing 69, the opposite conical end of the operative portion 63 of the shift-rod is withdrawn from contact with the pins 58 of the gear-wheel 49, which is driven in the opposite direction from the gears 45 and 46 by means of the intermediate 48. The release of the pins 58 of this clutch-gear operates in a manner similar to that already described to couple the fixed and loose members so as to rotate the shaft 47 negatively, or in the opposite direction from that previously described; and the return of the shift-rod 62 to initial position similarly causes the driving connection between the driving and driven shafts to be discontinued.

Figures 12, 13, 14, 15, 16, 17, 18:
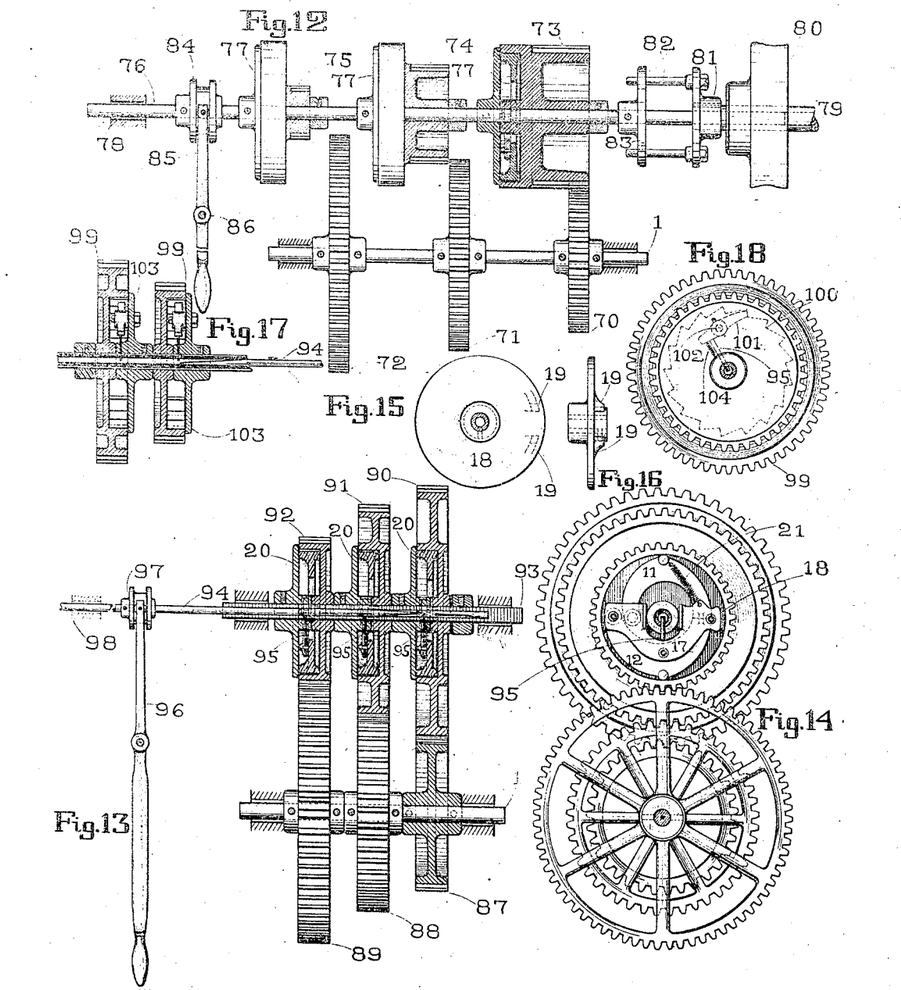
Fig. 12 is an elevation, partly in section, of another form of the improvement.
Figs. 13 to 16, inclusive, represent still another form of the improvement, Fig. 13 being an elevation partly in section, and Fig. 14 an end view of the transmitter, and Figs. 15 and 16 face and edge views of one of the driving clutch-members.
Figs. 17 and 18 are, respectively, a sectional elevation and an end view of still another form of the improvement.

In the modification shown in Fig. 12, the driving shaft 1 carries a series of fixed gears 70, 71 and 72 adapted to mesh with a corresponding series of loose clutch-gears 73, 74 and 75, respectively, mounted upon the reciprocating driven shaft 76 and provided with clutch-parts similar to those of the transmitting mechanism represented in Figs. 6 to 11 for coupling the same to the fixed disks 77 with which they coöperate. The shaft 76 is shown fitted at one end to a fixed bearing 78 and supported at the opposite end in a hollow shaft 79 supported in the fixed bearing 80 and having fastened to its adjacent end one member of a coupling comprising the head 81 with parallel pins 82 of which the opposed member is rigidly secured to the shaft 76 and comprises a flange 83 having apertures to which the pins 82 are slidingly fitted. The shaft 76 is provided with a fixed grooved collar 84 embraced by one end of a shift-lever 85 pivoted at 86 upon a suitable stationary abutment by means of which lever the driven shaft 76 may be longitudinally shifted to bring its gears successively into engagement with the stepped driving gears 70, 71, 72, respectively, whereby the shaft 76 may be given relative speeds proportionate to the sizes of each pair of intermeshing gears of the series.

In Figs. 13 to 16 inclusive, is represented a form of the improvement, comprising a plurality of intermeshing gears arranged in pairs proportioned to transmit different relative speeds, each pair comprising a clutch similar to that described in connection with Figs. 1 to 5, inclusive, but provided with means for forcibly disengaging or maintaining out of engagement the operative parts of such clutches in succession. In this form of the improvement, the driving shaft 1 is provided with a series of fixed gear-wheels 87, 88 and 89 of different diameters meshing with a corresponding series of loose gears 90, 91 and 92, respectively, upon the hollow driven shaft 93, each of the latter gears being provided with a cylindrical cavity containing clutch-levers 11 and 12 abutting together at one end and having the opposite end pivotally connected at separated points to one end-portion of the operating lever 17 whose rounded opposite end 18 is embraced by the projecting lugs 19 upon the inner face of the fixed disk 20, as in Figs. 1 to 5. Fitted to the hollow shaft 93 is a shift-rod 94 having a conical operative end adapted to engage the inner extremity of a sliding pin 95 passing through the hub of each disk 20 and having its outer end in contact with the operating lever 17. As represented in Fig. 13 the shift-rod 94 is in such position that the pins 95 of the clutch-wheels 91 and 92 are retained in their outer positions and the operating lever 17 engaged by each forced laterally in opposition to its spring 21 to relieve the normal pressure upon the clutch-levers 11 and 12 so as to hold the clutch-parts out of driving engagement, while the pin 95 of the clutch-wheel 90 is allowed to remain in its inner position to permit the operating lever 17 of the clutch to act normally in maintaining driving relation between the parts 20 and 90. As will be readily understood from the foregoing description of the operation of the device represented in Figs. 6 to 11, inclusive, the throw of the shift-rod 94 to the right by actuation of the forked lever 96 embracing the grooved collar 97 thereon will cause the forcible disengagement of the clutch-parts of the gear-wheel 90 by means of the radial pin 95, which action will cause the entire interruption of driving relation between the shafts 1 and 93, while the progressive movement of the shift-rod 94 into the other extreme position in which the grooved collar 97 rests against the stationary bearing 98 will cause the successive movements of the clutch-parts of the several gear-wheels into contact relation, those of the higher speed gearing in such contact relation being thrown also into driving relation.

In Figs. 17 and 18 is represented a positive clutch device which may be employed, if desired, in lieu of that shown in Figs. 13 and 14. As represented in these figures, the clutch-gears 99 are provided with internal ratchet-teeth 100 adapted to be normally engaged by the spring-pressed pawl 101 mounted upon a lateral pin 102 carried by the fixed disk 103 and held normally in operative position by the spring 104. As represented in Figs. 17 and 18, the hub of the disk 103 is provided with a radial sliding release pin 95 of which the outer end rests against the tail of the pawl 101 and the inner extremity lies in the path of the beveled end of the shift-rod 94. The longitudinal movement of the rod 94 causes the successive disengagement and reengagement of the pawls 101 in a manner similar to that of the clutch-parts in the form of the improvement represented in Figs. 13 and 14.

Figures 19, 20, 21, 22, 23:
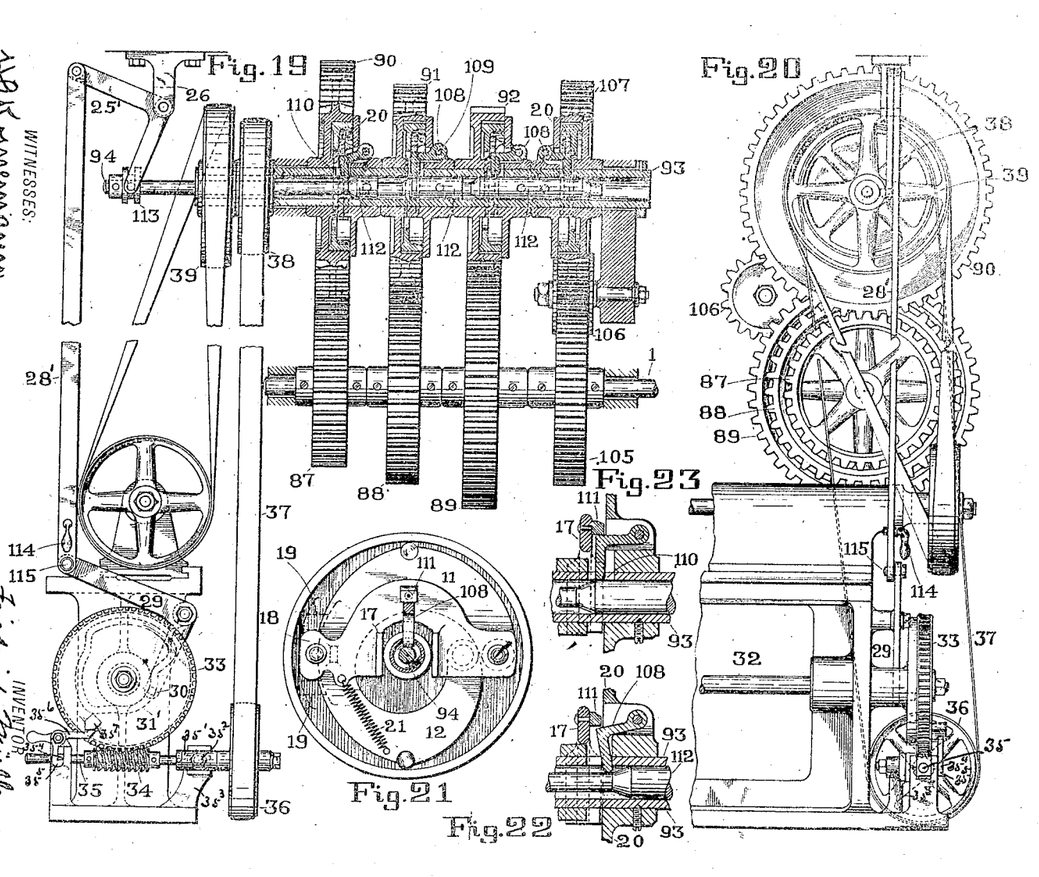
Figs. 19 to 23, inclusive, represent the present improvement in in its preferred form, Fig. 19 being a side elevational view, partly in section, of the transmitting mechanism belted to a machine provided with an automatic speed changing actuating device, Fig. 20 an end elevation of the same, and Figs. 21, 22 and 23 being detail views of one of the clutch-pulleys and its clutch-controlling device.

In the preferred form of the improvement represented in Figs. 19 to 23, inclusive, the driving shaft 1 is provided, similarly to that form of the transmitter shown in Figs. 13 and 14, with fixed driving gear-wheels 87, 88 and 89, of graduated sizes and an additional fixed driving wheel 105, the former meshing respectively with the loose gears 90, 91 and 92 upon the hollow driven shaft 93, and the latter with an intermediate 106 which in turn meshes with a loose gear 107 also mounted upon the hollow shaft 93. Each of these loose gears is provided with a drum having a cylindrical cavity containing clutch-levers 11 and 12 abutting together at one end and having the opposite end pivotally connected at separated points to one end portion of the operating lever or rocker 17 whose rounded opposite end 18 is embraced by the projecting lugs 19 upon the inner face of a disk 20 fixed upon the hollow shaft 93. The operative members of the clutches of the gear-wheels 90, 91 and 92 are so disposed as to cause the fixed disk 20 to be rotated positively, or in the forward direction, while those of the gear-wheel 107 are oppositely disposed, so as to drive the corresponding disk 20 negatively or in a backward direction, under the action of the connected gears 87, 88, 89 and 105, of the driving shaft 1. Each of the disks 20 carries an angular dog 108 pivoted to suitable lugs upon the same by means of a pin 109, with its outer extremity entering a lateral slot 110 in the hollow shaft 93 and its angular portion or elbow resting in contact with a stud or projection 111 upon the operating lever 17. The bore of the hollow shaft 93 is entered by the shift-rod 94 which is shown provided with a series of cam-plugs 112 fitted to the interior of the shaft and each provided with a conical end adapted to engage the adjacent extremity of one of the pivoted dogs 108, that adjacent the gear-wheel 107 being of conical form at opposite ends to adapt it to operate in conjunction with the dogs of the gears 92 and 107. The cam-plugs 112 are of such length and their conical extremities so spaced apart that when the shift-rod 94 is moved to the left during the rotation of the shaft 93 forward at its highest speed, the dogs 108 of the loose gears 92, 91 and 90 will be engaged, as indicated in Figs. 22 and 23, successively in the order named, the cylindrical surface of the longer cam-plug 112 maintaining the dog of the wheel 107 elevated to maintain its operating lever 17 in inoperative position to relieve the pressure of the clutch-levers 11 and 12 upon the walls of the clutch cavity, while the clutches of the adjacent wheels are successively thrown out of operative relation to interrupt the driving relation of the clutch-wheels with the intermeshing gears of the driving shaft. After the driven shaft 93 has come to rest, the further shift to the left of the rod 94 operates to enable the clutch-dog 108 of the wheel 107 to drop inwardly beyond the conical end of the cam-plug 112 so as to permit the operating lever 17 under the action of its spring 21 to throw the clutch-levers 11 and 12 into driving relation and thereby initiate the reverse movement of the driven shaft 93 through the fixed disk 20 forming a part of such clutch. It will be seen that the action of the shift-rod 94, in this as in the other forms of the present improvement herein shown and described, is negative under all conditions, its movements serving merely to permit the engagement of the clutch-levers with their respective clutch-wheels or to withdraw them from such engagement, the normal contact relation of such levers with the clutch-wheels being sufficient to insure their operative relation in case their relative speeds of rotation as before described are of suitable character. While the shift-rod 94 is shown herein as a reciprocating part for successively engaging the radial clutch-controlling pins 95, it is evidently immaterial whether its movements in relation to the inner ends of said pins be endwise or rotary, its cam portions 112 being properly formed and positioned to accord with the conditions under which it is designed to act.

As in the form of the present improvement illustrated in Figs. 1 to 5, inclusive, the mechanism last described is adapted for use in connection with that class of automatic machine-tools in which the actuation of a rotary tool and of the feed of the work or of such tool is communicated separately from the countershaft. In this form of the improvement, the driven shaft 93 is shown provided with two pulleys 38 and 39 of which the latter is belted to a corresponding pulley upon the tool-actuating shaft, while the former is connected by the belt 37 with a pulley 36 upon a shaft 35 carrying a worm 34 which meshes with the worm-wheel 33 upon the shaft 32 and having attached thereto a disk provided with an irregularly formed cam-groove 31¹ entered by a pin 30 upon one arm of a bell-crank lever 29 whose other arm is connected by means of a rod 28¹ with one arm of a bell-crank lever 25¹ carried by the bearing bracket 26 whose other arm embraces the grooved collar 113 upon the shift-rod 94.

As will be readily understood, the rotation of the worm 33 with its attached cam in the operation of the transmitter causes the bell-crank lever 29 to be rocked upon its fixed center upon the machine frame, and through the connections 28¹, 25¹ and 113 to slowly move the shift-rod so as to automatically vary the speed of the machine as the work requires.

When it is desired to reverse the motion of the machine, the lower end of the rod 28¹ may be shifted laterally by the operator grasping the handle 114 so as to disengage the perforated extremity of such rod from its pivotal pin 115 upon the bell-crank lever 29, when the rod 28¹ may be manually shifted so as to throw the shift-rod 94 into its extreme left-hand position for the release of the clutch-dog 108 of the wheel 107 from its controlling cam-plug 112. The shaft 93 may be again brought to rest by a reverse motion of the connecting rod 28¹.

The worm-shaft 35 is shown herein supported adjacent the pulley 36 in a box 35¹ pivoted at 35² to an arm 35³ of a supporting bracket and provided with a well-known form of throw-out device for disengagement of the worm 34 with the worm-wheel 33, and comprising a vertically sliding box for the opposite end of the worm-shaft provided with a lateral stud 35⁴ engaged by the hooked arm 35⁵ of an angular latch-lever whose other arm 35⁶ lies in the path of movement of a tripping lug 35⁷ carried by the worm-wheel 33. The worm-shaft 35 having been shifted upwardly to bring the worm 34 into engagement with its worm-wheel 33, and the stud 35⁴ having been thereby raised into engagement with the hooked arm 35⁵ of the latch-lever, the worm is permitted to make a complete rotation induced by the rotation of the pulley 36, until the tripping lug 35⁷ comes into the position shown in Fig. 19, when the latch-lever is tripped and the adjacent end of the worm-shaft permitted to drop so as to disengage the worm 34 from the worm-wheel 33.

While in certain other forms of the present improvement the coupling of the driving and driven members of the gearing is effected by positive means, involving a certain amount of shock in passing from one speed to another where the differences in rapidity are considerable, in those represented in Figs. 13 and 14 and in Figs. 19 and 20 the degree of engagement of each of the clutches may be readily graduated by a slow movement of the shift-rod to cause a corresponding regulated movement of the release member, whereby the action of the clutch-levers 11 and 12 upon the walls of the cavity containing them may be gradually varied. In each embodiment of the present improvement, as herein represented, the clutch wheel or wheels are shown mounted upon the driven shaft of the transmitter, but it is obviously immaterial to the present invention to which of the connected shafts such clutch wheel or wheels are applied, the result being the same with either arrangement of the clutch wheels.

As represented herein, each form of the improvement involving the employment of a longitudinally moving shift-rod for controlling the clutches of the intermediate connections of the driving and driven shafts includes also a hollow shaft to which such shift-rod is fitted, but it is evidently immaterial whether such rod be wholly surrounded by the shaft upon which is mounted the clutch-gear which it controls or whether it be fitted to a key-way in said shaft; nor is it material, as concerns the method of control of the clutches whether the direction of rotation of the clutch-wheels be in the same or opposite directions; nor is the number of independent connections employed between the driving and driven members an essential part of the improvement, these matters being determined by the particular uses for which the power transmitter may be designed.

Although each of the forms of the power transmitter embodying the present invention herein shown and described includes two separate shafts, of which one may be considered the driving and the other the driven member, it is to be understood that the driving and driven members are not necessarily two separate and independent shafts, but that the transmission of power may be effected from one of such members to another mounted upon a single shaft, and that the present invention is not therefore limited to the employment of a driving shaft and a driven shaft with intermediate connections of the character described.

Having thus set forth the nature of the improvement, it will be observed that the invention is capable of considerable modification in construction and arrangement of parts without substantial change of its identity, its essential feature being the series of independent driving connections between the driving and driven members of such character and under such control that the driving and driven members remain in continuous driving relation during the changes from one speed to another.

By the term "different speeds" as employed in the appended claims, is to be understood the diverse movements communicated through the connecting cog- or belt-gearing intermediate the driving and driven members, whether positive, as in transmitting the power for performing work in machine-tools or negative as in transmitting the power for effecting the reverse or return feeding movements in such machines.

I have not claimed specifically herein the means for throwing out of operative relation the coacting members of the self-engaging clutch forming a part of the power transmitter shown and described herein, as the same is claimed in my application, Serial No. 246,839, filed February 23, 1905.

Having thus set forth the nature of my invention, what I claim herein is,—

1. In a power transmitter, the combination with a driving and a driven member, of a plurality of connections between the same, each comprising a single clutch having a driving and a driven part each of which is positively connected with its respective member, said connections being constructed and arranged to communicate independently from the one to the other of said members different relative speeds and to maintain a continuous driving relation between the same through all changes of speed, and means whereby said clutches are controlled for changing the speed of the driven member or for wholly disconnecting the driving from the driven member.

2. In a power transmitter, the combination with a driving and a driven member, of a plurality of connections between the same constructed and arranged to communicate independently from the one to the other of said members different relative speeds and at least one of said connections comprising a clutch operative in one direction only of which the operative members are in active engagement when the connection or connections having the higher speed are not in driving relation, and means for controlling the clutch or clutches for producing changes in the speed of the driven member or for wholly disconnecting the driving from the driven member.

3. In a power transmitter, the combination with a driving and a driven member, of a plurality of connections between the same constructed and arranged to communicate independently from the one to the other of said members diverse movements, in respect of speed or direction, each including a clutch comprising self-acting frictionally engaging parts normally in contact relation but operative in one direction only, and means for successively disengaging and maintaining disengaged the coacting parts of said clutches.

4. In a power transmitter, the combination with a driving and a driven member, of a plurality of connections between the same constructed and arranged to communicate independently from the one to the other of said members diverse movements in respect of speed or direction, each including a clutch comprising self-acting frictionally engaging parts, one only of said clutches being operative at a time and the component parts of the others driven at lower speed resting in contact relation and in readiness for active engagement, and common means for successively disengaging the coacting parts of said clutches.

5. In a power transmitter, the combination with a driving and a driven member, of a plurality of connections between the same constructed and arranged to communicate independently from one to the other of said members diverse movements in respect of speed or direction, each including a clutch comprising self-acting frictionally engaging parts, and means for controlling said clutches whereby one only is operative while the operative parts of those driven at higher speeds are wholly disengaged and those of lower speeds remain in contact relation in readiness for positive engagement.

6. In a power transmitter, the combination with a driving and a driven member, of a series of connections between the same proportioned and arranged to communicate independently from the one to the other of said members diverse movements, in respect of speed or direction, each including a clutch comprising self-acting frictionally engaging parts, and a common disengaging device for successively interrupting engagement of the coacting parts of said clutches beginning with that driven at the highest speed while permitting those of lower speed to remain in either actual driving relation or in contact relation in readiness for operative engagement.

7. In a power transmitter, the combination with a driving and a driven member, of a series of connections between the same constructed and arranged to communicate from the one to the other of said members diverse movements, in respect of speed and direction, and each comprising a clutch-wheel and spring-actuated clutch-levers normally engaging the same, a radially movable controlling device adapted to be shifted in opposite directions whereby the action and inaction of said clutch may be controlled, and a common actuating rod arranged and operated to successively operate said controlling devices.

8. In a power transmitter, the combination with a driving and a driven member, of a series of connections between the same constructed and arranged to communicate from the one to the other of said members diverse movements, in respect of speed and direction, and each comprising a clutch-wheel and clutch-levers normally engaging the same, a radially movable controlling device adapted to be shifted in opposite directions whereby the action and inaction of said clutch may be controlled, and a common axially-reciprocating actuating rod provided with spaced cam-pieces adapted for successive engagement with said controlling devices.

9. In a power transmitter, the combination with a driving and a driven member, of a series of connections between the same constructed and arranged to communicate from the one to the other of said members diverse movements, in respect of speed and direction, and each comprising a clutch-wheel and clutch-levers with connected spring-pressed operating lever normally engaging said clutch wheel, a pivoted angular clutch-controlling dog movable radially of said clutch-wheel and having its angular portion engaging said operating lever in opposition to its spring, and a common actuating rod provided with spaced cam-pieces adapted for successive engagement with the free ends of the clutch-controlling dogs.

10. A power transmitter comprising a driving and a driven member, a plurality of connections between the same constructed and arranged to communicate independently from one to the other of said members different relative speeds and each comprising a clutch of which the operative members are in active engagement when those of the next higher speed connection are not in driving relation, means for controlling the effective operation of said clutches, and a driving connection between said means and the said driven member of the transmitter.

11. The combination with a power transmitter comprising a driving and a driven member, of a plurality of connections between the same constructed and arranged to communicate independently from one to the other of said members different relative speeds and each comprising a clutch of which the operative members are in active engagement when those of the next higher speed connection are not in driving relation, means for controlling the effective operation of said clutches, a cam, a connection with the driven member from which said cam receives its movements, a follower engaging said cam, and a connection between said follower and the controlling means for operating the latter.

12. In a power transmitter, the combination with a driving and a driven member, and a plurality of connections between the same each comprising a single clutch including self-acting frictionally-engaging parts, of common manually controlling means for operating said clutches whereby the disengagement of the coacting parts of one of said clutches causes the automatic active engagement of the coacting parts of another of said clutches unaffected directly by said controlling means.

13. In a power transmitter, the combination with a plurality of clutches each comprising self-acting frictionally engaging parts normally in contact relation but operative in one direction only, of a common controller therefor acting to successively force said engaging parts out of engagement.

14. In a power transmitter, the combination with a plurality of clutches, each comprising interengaging parts normally in contact relation but operative in one direction only, and a common controller for said clutches arranged and adapted to successively throw the interengaging parts of each of said clutches into inactive relation and to maintain them in said relation.

15. In a power transmitter, the combination with a plurality of clutches each comprising self-engaging coacting parts and a common shaft upon which said clutches are mounted, and a common controlling rod disposed longitudinally of said shaft and provided with a series of spaced operative portions each adapted to control the operation of its respective clutch.

16. In a power transmitter, the combination with a plurality of clutches each including self-acting frictionally engaging parts, a common shaft upon which said clutches are mount and a common controlling rod disposed longitudinally of said shaft and provided with a series of spaced operative portions each adapted to forcibly disengage the coacting parts of its respective clutch.

17. In a power transmitter, the combination with a driving and a driven member, of a plurality of connections between the same constructed and arranged to communicate independently from the one to the other of said members diverse movements in respect of speed or direction, each including a single clutch comprising self-engaging parts, one only of said clutches being operative at a time and the component parts of the others driven at lower speed resting in contact relation and in readiness for active engagement, and common means for successively disengaging the coacting parts of said clutches.

18. A power transmitter comprising a driving and a driven member, a plurality of connections between the same constructed and arranged to communicate independently from one to the other of said members different relative speeds, and at least one of said connections comprising a clutch of which the operative members are in active engagement when the connection or connections having higher speed are not in driving relation, automatically acting means for controlling the effective operation of said connections, and a driving connection between said means and said driven member of the transmitter.

19. In a power transmitter, the combination with a driving and a driven member, of a plurality of connections between the same constructed and adapted to communicate independently from the one to the other of said members different relative speeds in the same direction and to maintain a continuous driving relation between said members through all changes of speed in the same direction, an additional connection between said driving and driven members constructed and adapted to transmit motion between said members in the opposite direction, and common means for controlling said connections for effecting changes of speed and direction of movement of the driven member, and for wholly disconnecting the driving from the driven member.

20. In a power transmitter, the combination with a driving and a driven member, of a plurality of connections between the same constructed and arranged to communicate from one to the other of said members diverse movements, one of said connections being arranged to transmit motion to the driven member in one direction and another of said connections to transmit motion to the driven member in the opposite direction, and each of said connections comprising a clutch-wheel and self-acting frictionally-engaging clutch-levers normally engaging the same, and a common actuating device arranged and operated to successively withdraw each of said clutch-levers from engagement with its respective clutch-wheel.

21. In a power transmitter, the combination with a driving and a driven member, of a plurality of connections between the same constructed and arranged to communicate independently from one to the other of said members different relative speeds, at least one of said connections comprising a clutch having self-cramping parts operative in one direction only, and means for disengaging the self-cramping clutch-parts to render them inoperative in both directions of relative movement of said members.

22. In a power transmitter, the combination with a driving and a driven member, of a plurality of connections between the same constructed and arranged to communicate from one to the other of said members different relative speeds, at least one of said connections comprising a transmitting drum positively connected with one of said members, a transmitting part positively connected with the other of said members, a frictionally engaging part normally in contact relation with said drum, a rocker carried by said transmitting part and having a connection with said engaging part whereby the latter may be forced into operative engagement with said drum when actuated in one direction only, and means for forcibly moving said rocker in the opposite direction for preventing the operative action of said engaging part with said drum in either direction of relative movement of said driving and driven members.

23. In combination, a driving and a driven member, a series of connections for communicating from one to the other of said members different relative speeds, each of said connections comprising a drum, a frictionally engaging part normally in contact relation with said drum and an operating lever or rocker pivotally connected with said engaging part at different distances from the axis of rotation of said drum, and means for shifting said lever or rocker to withdraw said engaging part from operative relation with said drum and thereby permit the relative movement of said driving and driven members in either direction.

24. In a power transmitter, the combination with two shafts, and a stepped series of gears having positive connections with one of said shafts, of a second stepped series of gears mounted loosely upon the other of said shafts and meshing with those of the first series, connections involving a one-way acting clutch intermediate each gear of the second series with its shaft, and means including an independently operated device for controlling the relation of the component members of two adjacent clutches whereby the control of the one by means of said device causes the simultaneous automatic actuation of the other.

25. In a power transmitter, the combination with a driven shaft, a series of driving members loosely mounted thereon and means for rotating the same at different speeds, of a series of driven members fixed upon said driven shaft, automatically acting clutch parts intermediate each driving member and its respective driven member and operative in one direction only, and independently controlled means for forcibly interrupting the operative relation of the clutch parts of the lower speed member or members whereby those of the next higher speed are caused to simultaneously assume driving relation.

26. The combination with a driving shaft and a driven shaft, of a plurality of trains of gearing of different speeds, each having a member mounted on and positively connected with said driving shaft and an interengaging member loosely mounted upon said driven shaft, means whereby each train of gearing is adapted to be automatically connected to the driven shaft, but only one at a time may remain in actual driving relation therewith, and means for forcibly controlling the connecting means of lower speed or speeds whereby those of the next higher speed are caused to automatically establish driving relation between the driving and driven shafts.

In testimony whereof, I have signed my name to this specification, in the presence of two subscribing witnesses.

FRIEDERICH MÜLLER.

Witnesses:
H. J. MILLER,
W. A. KORNEMANN.